March 16, 1965     F. A. DEWEY ETAL     3,173,813
METHOD AND APPARATUS FOR BONDING STAINLESS STEEL HONEYCOMB
Filed March 28, 1960     2 Sheets-Sheet 1

INVENTORS
FERRIS A. DEWEY
JOHN E. GAROL
JOHN C. HOLMBERG
NEIL R. WILLIAMS
BY Edwin Coates
ATTORNEY March 16, 1965 F. A. DEWEY ETAL 3,173,813
METHOD AND APPARATUS FOR BONDING STAINLESS STEEL HONEYCOMB
Filed March 28, 1960 2 Sheets-Sheet 2

INVENTORS
FERRIS A. DEWEY
JOHN E. GAROL
JOHN C. HOLMBERG
NEIL R. WILLIAMS
By Edwin Coates
ATTORNEY

United States Patent Office 3,173,813
Patented Mar. 16, 1965

3,173,813
METHOD AND APPARATUS FOR BONDING
STAINLESS STEEL HONEYCOMB
Ferris A. Dewey, John E. Garol, and John C. Holmberg, Tulsa, and Neil R. Williams, Skiatook, Okla., assignors to Douglas Aircraft Company, Inc., Santa Monica, Calif.
Filed Mar. 28, 1960, Ser. No. 18,123
7 Claims. (Cl. 148—125)

This invention relates to the fabrication by heat and pressure joining, of structures from structural components, such as the components of low-density honeycomb core structural panels.

Such panels comprise a honeycomb core united facewise to a pair of face-sheets, and the core may well consist of a honeycomb of kraft, or other, paper while the face plates may each consist of a ceramic facing sheet, the bonding material then being a resin-adhesive. Further, the facing off plates may consist of a ceramic bonded to a metallic honeycomb, or other, core, by another kind, or the same kind, of ceramic.

However, the present invention is more particularly concerned with the fabrication of all-metal structural panels, in which the honeycomb core is composed of an austenitic stainless steel, as are the facing off plates, the bonding material consisting of a suitable alloy-and-flux brazing material, which may be a composition of a ferrous or nonferrous alloy with a flux. Preferably, a novel alloy of silver and lithium is used.

Currently, stainless steel honeycomb panel components are placed in a "brazing box" sandwiched between expendable slip sheets, and a thin diaphragm is welded in placed over the top of this sub-assembly. Graphite reference blocks, or back-up members, support the aforesaid elements on each face of the sub-assembly. To offset the graphite blocks, any suitable type of insulation laminae are placed over the top of the diaphragm.

All of the aforestated components are then put into an ordinary brazing retort. A very slight suction is then applied to the brazing box itself and an inert gas, such as argon, is pumped into the brazing box, replacing the remaining air. This entails the use of an argon-filled room with air-locks and oxygen masks worn by the attendants as well as necessitating careful husbanding of the rather costly argon. Even thus, a considerable amount of argon is wasted during subsequent operations.

Since such "tooling" involves considerable mass and weight, the heating power consumed is considerable and costly and, what is worse, the heating of all these massive parts is unavoidably slow, since the rate of heating varies with the furnace capacity, with the mass of the parts of the apparatus and with the peculiar design thereof necessitated to obtain any sort of uniformity of heating.

The brazing-heating step invariably consumes several hours, during all of which time costly heat-power is being expended and costly argon gas is being "used up" or lost.

For these, and other, reasons—slow heating, etc.—the brazing material inevitably "skulls," that is, the alloy separates into its components, or at any rate, portions thereof dissociate as "drops" and it is no longer an integral, homogeneous, amalgam. Such skulled brazing material is not either adhesive, strong, or cohesive enough to satisfy high-stress requirements.

The current practice also necessitates a very slow cooling rate, both to anneal and to then harden, and then temper the panel. Usually this period is of the order of 48 hours. Aside from time-profit factors, the resultant panel is weaker all over and has a lower resistance to corrosion than is desirable. It is also invariably badly oxidized, rendering it susceptible to corrosion, as well as reducing the "effective" thickness of the stainless steel parts.

The present invention provides methods and apparatus for at least minimizing all these deficiencies; in fact, this invention entirely obviates all, or nearly all, of said deficiencies.

Among other improvements effected thereby, it totally eliminates the necessity for the use of a fabrication room and an apparatus as well which are both filled with a costly inert gas, in lieu thereof providing an airtight but flexible envelope for the panel assembly, the envelope being placed in a larger evacuatable container which also carries the heating, cooling, and envelope-compressing means, as well as "reference" means for the aforesaid means. One set of each of these several means is employed to back up each major face of the aforesaid envelope. This envelope and the larger container are evacuated almost completely of air and oxygen, thus precluding oxidation, corrosion and contamination. The invention thus obviates the use of inert gas filled rooms, oxygen masks, air-locks and the like, as well as minimizing the costs of production. By virtue of improved apparatus, it reduces the fabrication period of any given size of structural panel from the conventional 48 hours term to a period of slightly over four hours, thus further reducing the fabrication costs per square foot of panel. Withal, it provides such complete and strong bonding of the cell-ends of the core to the adjacent facing-off plates that under that amount of tension or shear applied to the jointure which heretofore has resulted in total failure of the bond, in the present case, rather than the bond or jointure first failing, the cell-walls themselves fail first, indicating the completeness and strength of the jointure as well as the fact that the bonding material has filleted-up completely and strongly around each cell-end and has not "skulled." Absence of "skulling" contributes considerably to this enhanced strength and it may well be that because of the absence of skulling, the brazing material itself is enabled to alloy or amalgamate with both the metal of the cell-end walls and that of the facing-off plates.

Among the improvements in the method itself may be mentioned the step of unusually rapid heatings of the assembly in an evacuated envelope, for this extreme rapidity melts and flows all of the brazing material, causes it to "wet" the cell end walls and the plates more nearly completely and allows a capillary action to fillet-up the molten brazing material farther upon, and into better and stronger union with, the cell-end walls.

Another specifically improved feature provided by the present method resides in the rapid cooling steps, for the low time-factor or short duration of this step allows the strengths of the metal parts to be preserved and it remains substantially at the initial values, at the same time preserving the initial resistance to corrosion of these metallic parts.

More specifically, the apparatus of the present invention essentially comprises a self-contained unit, complete in itself, without the aid of auxiliary apparatus such as retorts, argon-filled rooms, etc. It includes an airtight, evacuated, flexible capsule containing the core, facing-plates and brazing material this capsule being backed up, top and bottom, by heating and pressure-applying and cooling, trigger annealing, hardening, and tempering means arranged seriately in facewise parallelism therewith, these functionalities lying outside the capsule, and also being enclosed in an air-tight, evacuated container, which contains the capsule, the vacuum in which can be accurately controlled. The size or area of the capsule and of said container, as well as the sizes of the heating pressure-applying and cooling-and-tempering means etc. of course vary in proportion to the sizes of panels to be fabricated, but in no event are they massive or extensive in proportion to the area to be brazed, contrary to the prior art.

The improved brazing and pressurizing of the parts undergoing brazing, and the trigger annealing, hardening, tempering, and final cooling procedures are all carried out with the panel-parts remaining in the capsule, which capsule and all the other functionalities remain in the larger evacuated container throughout the substantially four hour period.

The method in its essential entirety comprises the steps of assembling the metallic honeycomb core facewise between a pair of metallic facing-off plates, the latter in turn having each of their inner faces covered with a sheet of brazing-and-flux material, such as a silver-lithium brazing sheet; enclosing this assembly in a flexible-walled airtight capsule; interposing the capsule and its contents in an airtight container; evacuating both the capsule and the container so as to remove air from the capsule as well as the skin-layer of air from the surfaces etc. of the plates and of the core and further to remove air and contaminants from the larger container; maintaining this dual vacuum while applying electric-resistance heat or other heat to the capsule and contents that is sufficient to fuse the silver-lithium sheets and flow them, filletwise, around each and every cell-end wall and applying equal and oppositely directed compressive forces to the opposite faces of the assembly in the capsule. During the aforestated brazing step, the temperature is maintained at of the order of 1750° F., for 10–15 minutes, not only to melt and flow the silver-lithium alloy, but to transform the austenitic stainless steel into true austenite. The invention then contemplates cooling the capsule and contents to 400° F. to effect trigger annealing; rapidly cooling from 400° F. to −320° F. to effect hardening and partial tempering of most of the austenite components of the stainless steel but not all are hardened although all the material in the panel is hereby transformed into martensite, the duration varying from 15 minutes to 2 minutes, depending upon whether or not the original ductility or softness is high or low; discontinuing this refrigeration and raising its temperature for no more than the order of 850° F. and holding it at this temperature for no more than four hours, to precipitation-harden those particles of the austenite that were not transformed into martensite and temper untempered entities in it, as well as to provide stress-relief; and returning the panel to room temperature (70° F.) and removing it from the zone of operations in a completely bonded, improved condition.

The present method and apparatus are hereinafter more particularly described in conjunction with the accompanying drawings showing one of the presently-preferred embodiments of apparatus for performing the improved method. However, it is to be understood that these drawings and this description are not limitative but merely exemplificatory.

Figure 1:
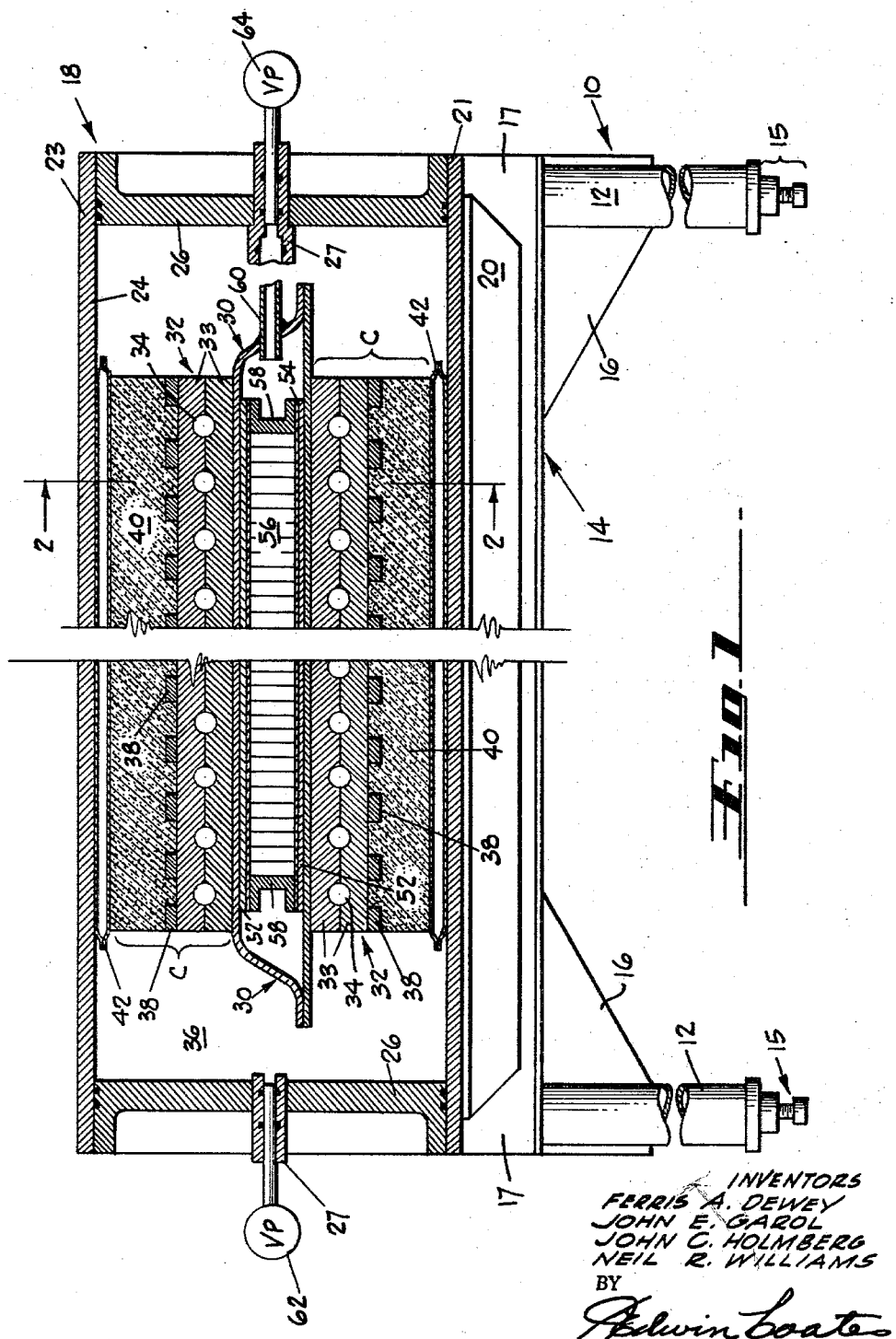
FIG. 1 is a somewhat diagrammatic longitudinal central section of the prototype single-unit, or self-contained apparatus, omitting the source of electricity, pressure-air, vacuum source, hot and cold fluid sources and their conduitry or connections.
Figure 2:
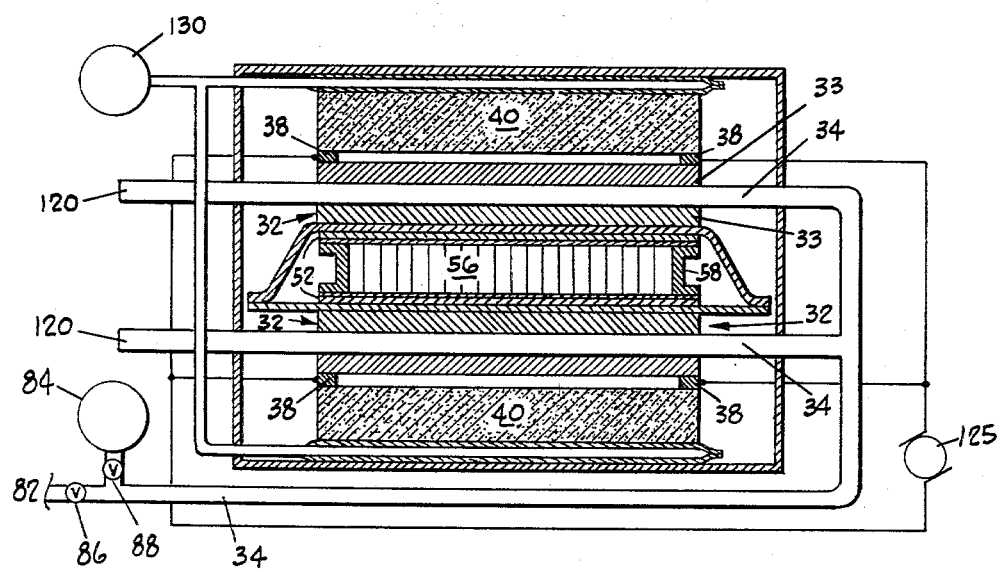
FIG. 2 is a cross-section on line 2—2 of FIG. 1, taken to show the matters omitted from FIG. 1.

As representatively depicted in FIGS. 1 and 2, a self-contained brazing unit 18 for use in uniting a pair of metallic facing-off plates to a metallic honeycomb core in an improved manner according to this invention may well be mounted in a room, filled with air, at atmospheric temperature and pressure, upon a table 10 which has adjustable length legs 12 and a planar top 14. The legs 12 are rendered adjustable by means of simplified, built-in screw jacks 15, in order to enable "setting" the table top at any desired height off the floor. The top is reinforced by means of gussets 16, and I-beams 17. Angle irons 20 are attached to I-beams 17 to support unit 18. This construction of table is merely illustrative or typical, and constitutes no part of the essence of the invention.

The present unit comprises, first of all, a substantially rigid, substantially airtight strong metallic box or container 18, constructed of a removable top 23, a bottom 21, side walls 36, and hollow end walls 26, airtightly sealed as shown to the top, bottom and side walls. The top and bottom plates are thus also sealable to the other walls.

Centrally of each end wall is a cylindric, "bossed" aperture or inlet 27 into both of which a vacuum pump's suction lines may be seated, as shown. The vacuum pump 62 is connected to the left hand inlet 27 to evacuate box or unit 18, and the vacuum pump 64 is connected to the right hand inlet 27 which in turn is connected by conduit 60 to the capsule 30 to evacuate it.

By means of this construction and arrangement, the air and "contaminants" contents of the box 18 and of the capsule and the panel may be substantially completely removed after the other components are in place. The vacuum in the capsule, although not the maximum attainable, is quite high and is of a substantally greater order than that in the box 18. This vacuum is continuously maintained by operation of the pumps throughout the process.

Disposed substantially centrally of the box 18 is a removable, flexible-wall airtight capsule 30, FIG. 1, made of stainless steel, preferably, the walls of which are 0.03 of an inch, preferably. The capsule consists of a pair of sheets welded together airtight all around and imperforate except for a connection 60 to the adjacent inlet 27 and vacuum pump 64. Capsule 30 may be removed from the box subsequent to the removal of the lid, or top wall, 23.

The capsule 30 rests upon a plurality of substantially rigid, substantially planar instrumentalities designated, as a group, by reference character C. The first or proximal one of these instrumentalities consists of a heat-exchanger group, as it were, designated 32 and consisting of a pair of facewise mating copper plates 33 which are sinously grooved on their abutting faces to form a serpentine conduit connected to pipe 34 adapted to conduit therethrough cooling fluids from sources 82 and 84. 82 is a source of normal compressed air at about 90 pounds per square inch such as the pressure air supply in a conventional factory. Member 84 is a tank of liquid gas such as air or nitrogen adapted to supply cooling fluid at a temperature of the order of −320° F. Valves 86 and 88 control the supply of the desired fluid, and pipes 34 exhaust to atmosphere at 120.

A similar heat-exchanger unit 32 rests upon the top of the capsule 30.

Each unit 32 is backed by a relatively not so thick reference block 40 composed of a light, non-gassing material, such as "Foamsil" or foamed silicon, which has a high insulative factor, both thermally and electrically. Block 40 is quite light yet is dimensionally stable from −450° F. to 2200° F. Outgassing from the blocks 40 is inhibited by the fact that foamed silicon contains only completely closed cells. Blocks 40 assist in preventing the actual temperature of the steel walled large container 18 from rising appreciably above 125° F. despite the fact that, as hereinafter manifested, the brazing and austenite-transformation temperature is elevated to the order of 1750° F.

In the inner face of each block 40 there is embedded an electric-resistance heating element 38 which takes the form of a metallic strip configured in serpentine fashion and connected at its opposite ends to the opposite poles of a source of electric energy, 125. Each of the elements 38 is in heat-transferring contact with an adjacent copper plate 32, both copper plates being in direct contact with capsule 30.

Interposed between the outer face of each block 40 and the adjacent wall of the large steel box and in face-wise parallelism therewith is a pressure-applying capsule 42. These capsules communicate as shown, with a source 130 of pressurized air which, when operated pressurewise, inflates the capsules "in parallel" and causes them to exert equal and oppositely directed compressive forces upon the blocks 40, and the heat-exchangers, whence it is applied to the thin-walled capsule 30 and ultimately upon the plates and core in 30, as, and for the purposes, later set forth.

The metallic assembly to be brazed in the evacuatable capsule centrally disposed in the evacuated box 18 usually consists of a pair of metallic facing-off plates 52, an alloy brazing foil 54 adjacent the inner face of each plate 52, and a central relatively low-density metallic honeycomb core 56, together with stainless steel channels 58 lying between the two plates and encompassing all sides, or the periphery, of the core.

The tube 60 may be flexible and connects, of course, with vacuum pump 64 through inlet 27. Thus, not only is it feasible to remove all free air from inside the capsule but, by proper operation of the pump, all the oxygen-containing "boundary layer" of air and all occluded air-containing oxygen, designated the "skin layer," can be removed from the skin and cell walls of the panel to be brazed. Hence very little, if any, oxidation or contamination of the panel can occur and the metallic components retain the pristine brightness and integrity of the parent metal, despite the fact that it is not necessary to employ an atmosphere of argon, or the like.

It thus becomes apparent why that no inert gas, such as the usual argon, need be employed as an anti-oxidant shield in the capsule or, in fact, anywhere else in the self-contained unit. For an additional reason any fumes emanating from the hot copper plates or the electric resistance heater are drawn out of the box 18 along with the oxygen-containing air therein before heat is applied and during the heating.

This exacuation of the box 18 reduces the differential between the box and the interior of the capsule 30. The capsules 42 can then be pressurized to produce just the amount of total pressure on the work that is desired.

It is to be observed that, by virtue of the aforedescribed construction and arrangement of parts, the total area to which heat is applied has been reduced, far below the conventional, to that specific area and volume which is almost entirely occupied or which can be occupied by panel elements themselves. Further, the "tooling" itself is of minimum bulk. Massive heat-transfer is thus obviated, thus minimizing the time-consumed and the cost of operation of the apparatus.

In operating the apparatus, the lid or top 23 of the unit or box is removed; the lower functional assembly C and pressure capsule 42 is inserted; the capsule 30 is placed on top of C and connected up to the vacuum line 28, and the upper assembly C and the upper pressure capsule 42 is laid atop capsule 30, and the various connections to the heating and cooling elements are established; and lid 23 is replaced. Thereafter, the electric heating elements are energized to raise the temperature of the copper plates, capsule and contents to the order of 1750° F. The panel elements and brazing foil are kept at this temperature for not over 15 minutes, and sometimes for only 10 minutes, depending upon the composition of the panel, in order to melt and flow the silver-lithium brazing material evenly and throughout each of the abutting surfaces of the panel. The pressure capsules 42 are inflated and cause the now liquid silver-lithium to fillet up deeply around each of the walls of each cell-end while maintaining its adherence to the entire inner face of each of the facing-plates.

It is to be noted that the copper plates 32 being highly conductive and being coextensive with the capsule 30, distribute the heat from the heating elements 38 quite uniformly throughout the brazing region and applies it to all the walls of each metallic cell end.

Coupled with this uniform heat-distribution, a subsequent very rapid lowering of the temperature of the panel's material, assuming it to be AM350, 17–7PH or PH 15–7MO austenitic stainless steel, to the trigger anneal temperature of 400° F. desirably transforms it into the stronger "austenite," with the Ag-Li alloy now evenly distributed and heavily filletted up around each cell-end's walls. Next, the time-temperature relationship is enhanced, so far as the time factor is concerned, by this step-down cooling of the panel to a trigger anneal temperature of the order of 400° F. by means of passing cool air from source 82 through the pipes 34 for a few minutes, usually of the order of 3–5 minutes depending upon the material of the panel, as above. By virtue of the relatively small copper mass utilized as a heat-exchanger, and the rather low "stored" heat, or retained heat-head in the copper members, reduction of the panel's temperature from 1750° F. to 400° F. can be effected rapidly usually in from 3 to 5 minutes. The novel copper heat-exchanger does this lowering of the heat far more rapidly than heretofore in this art and by this reduction in the time factor the austenitic steel is transformed into austenite. This low time factor also assures that the corrosion resistance of the panel is maintained and not, as is usual, lowered, by the brazing.

The next step, sub-zero cooling to transform austenite into martensite and partially harden it, is effectuated by now passing through the pipes 34 a liquefied gas, such as liquid air or liquid nitrogen. The article is held at −320° F. for a period not exceeding 15 minutes and sometimes as short as 2 minutes, depending upon the exact composition and ductility of the stainless steel components of the panel.

This rapid heating, followed by rapid sub-zero cooling, assures the integrity of the Ag-Li brazing material and prevents it from "skulling," the latter "disassociation" of the components of the alloy producing a weak brazing jointure.

In the final stages of the present brazing annealing, hardening and tempering procedure, the refrigeration by liquefied gas is discontinued and coils 38 are energized to raise the panel to a temperature of about 850° F. The panel is then maintained at this temperature for a period of about four hours to "precipitation harden" those few "particles" of the austenite which failed to be hardened by lowering to −320° F. quickly.

At the end of this four hour period, the heat-exchanger's operation is discontinued and the panel is allowed to cool to room temperature; or, the pipe 34 may have cold air circulated therethrough to more rapidly lower the panel to room temperature, although this latter depends chiefly on the initial composition of the panel. When the operation is completed, the capsule is removed from the box and cut open so that the panel may be removed.

Here let it be observed that the airtight capsule 30 isolates the panel from such possibly de-gassing or corrodible and contamination producing parts as the copper plates 32 and the heating elements 38, and in turn protects parts 32 and 38 from any gases which might otherwise emanate from the Ag-Li foil or its flux material. However, since the large box is evacuated before commencing brazing, there is small probability that 32 and 38 will corrode to any harmful extent. The vacuum is not high enough to augment any possible de-gassing from 32 and 38 and the Foamsil cannot itself "outgas" because all its cells are encapsulated, or entirely closed off from each other, and from the atmosphere.

Accordingly, since there is no ascertainable oxidation or corrosion of the panel, none of the usual sand-blasting of the panel after brazing need be employed.

The pressure that can be exerted upon the panel components and the liquefied brazing material by capsules 42 is precisely controllable and can be varied almost without limit because this uniting-pressure is exerted by the capsules 42 which may be controllably inflated to almost any extent. Also, the vacuum in both the capsule 30 and in the large container is equally well controllable to meet varying circumstances.

As compared to the conventional minimum of about 48 hours for completing the brazing procedure, the present invention enables same to be completed in from a little over four hours to a time just short of five hours, regardless of the area or size and thickness of the panel.

It will be apparent that the panel need not be flat as illustrated but may take any form usually used in such panels, and the capsule may be shaped to conform thereto.

Figure 3:
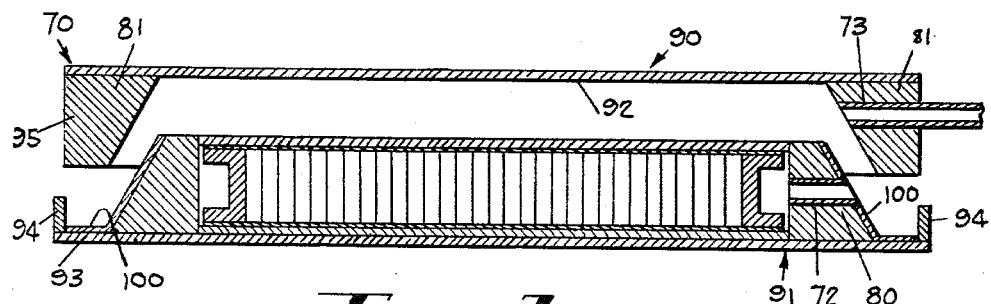
FIG. 3 is a longitudinal, substantially central section of a modified capsule containing the panel to be brazed, transformed, annealed, hardened and tempered.

In FIG. 3 a modified form of panel-encompassing capsule or envelope 70 is representationally depicted. As shown, this modification comprises first and second complementary "halves" 90 and 91 adapted to nest together to constitute a closed container. Each of these halves includes a thin flexible planar sheet 92 and 93. To the inner face of each such sheet at or near its ends, is secured a rigid, thick end wall, 81 or 80. The inner face of each of the confronting end walls is bevelled in such a manner that the bevels are complementary to each other to enable the halves to nest tightly together and form an enclosure for the panel parts to be brazed.

The side walls 94 of the first half are adapted, on nesting, to tightly overlap the side walls 95 of the second half. If desired the bevels and side walls may be lap-ground; or, conventional sealing means 100 may be employed.

Evacuating means 73 and 72 in the form of suction pipes leading to a vacuum pump, not shown, register axially in this species when the halves are nested to enable withdrawal of air and contaminants from the interior of the closed or nested enclosure to any desired or necessary degree.

In employing this modified capsule, the remainder of the apparatus and the procedure followed are the same as those aforedescribed, and the results obtained are equally satisfactory. Ease of assembly and of disassembly, as well as the ability to re-use this capsule repeatedly without damaging same, characterize this form of the capsule.

Figure 4:
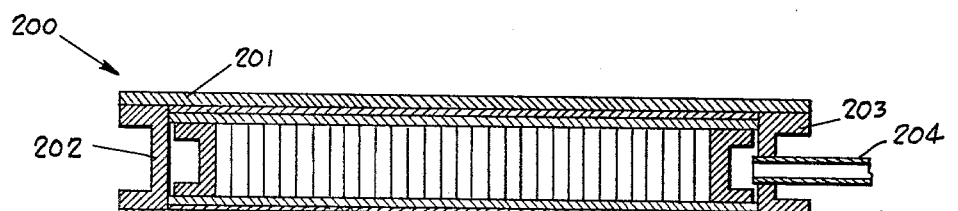
FIG. 4 is a view, similar to FIG. 3, of still another form of work-containing capsule.

In FIG. 4 there is representationally depicted still another form and construction of the capsule. It will be seen to consist of an airtight, evacuated work-encompassing and supporting capsule 200, comprising, a pair of coextensive, flexible, planar stainless steel sheets 201. Sheets 201 are spaced apart transversely of the capsule and define the two opposed major faces thereof. They are maintained spaced, but joined airtightly, by four channel-section strips 202 also of stainless steel of considerably thicker gage than that of the plates, strips 202 being arranged in rectangle-defining relationship to each other. These stiffer, less yielding strips 202 have their respective flanges 203, top and bottom, welded or otherwise united to the face of the adjacent one of the sheets 201, thus completing the capsule 200 after the panel-components are encompassed thereby.

At one end of the capsule 200, a suitable fitting 204 for connection to the vacuum pump is provided and by which all air and contaminants can be continuously removed from the capsule during all phases of the procedure.

Such evacuation, further, aids the pressure-air capsules aforementioned to more exectively force or compress the panel-components together before, during and after the brazing or bonding material has been reduced to the liquidus phase. When the operation is completed, the capsule 200 is cut open and the panel removed.

Although certain specific words and terms of art have been employed hereinabove, such usage has been adopted merely for the sake of concreteness and clarity, only and constitute no material limitation upon the essence of the invention. The invention itself is as defined in the subjoined claims.

We claim:

1. Apparatus for brazing a pair of metallic facing-off plates in facewise parallelism to a metallic honeycomb core to fabricate a structural panel, comprising: a substantially airtight container; means connected thereto for substantially evacuating same; a flexible capsule disposed substantially medially of said container, said capsule substantially airtightly enclosing the plates and core in mutual facewise parallelism and in parallelism with the major faces of the capsule, there being a layer of brazing-and-flux material interposed in parallelism between the inner face of each plate and the adjacent face of the core; said capsule communicating with means for evacuating said container and being removable with its contents from said container at the termination of the operations; a laminate of heat-transferring material of low specific heat in parallel abutment with each of the major faces of said capsule; hot-and-cold-fluid conducting passageways occupying each of said heat-transferring laminates and connected to sources of cold and warmer fluids for alternate passage therethrough of cold and warmer fluids at predetermined junctures in the operations; a mass of insulating material interposed in parallelism with, and between, the outer face of each laminate of heat transferring material and the adjacent wall of said container; a source of electric energy; an electric-resistance heating element embedded in the inner face of each of said masses of insulating material and connected to said source of electrical energy for resistance heating of said elements; a pressurized-fluid receiving capsule interposed between the outer face of each mass and the adjacent wall of the container, and means for supplying and removing capsule-expansion producing fluid with respect to each capsule at a predetermined juncture in the operations so as to press the plates and core together so as to force-flow the brazing material filletwise up around the walls of each of the cell-ends and throughout the inner surface of said plates.

2. A method of uniting planar metallic parts facewise to an intermediate part, comprising: assembling planar parts of stainless steel in facewise relationship to an intermediate part with a sheet of brazing material between the inner face of each planar member and the adjacent face of the intermediate member; enclosing the assembly in a transversely compressible flexible airtight zone free of all gaseous and foreign matter and being substantially evacuated; enclosing the airtight zone in a larger rigid airtight zone free of all gaseous and foreign matter and being substantially evacuated containing heating zones, cooling-and-heating zones and pressure applying zones, said zones backing up each face of the compressible zone; continuing evacuating both the compressible zone and the larger zone so as to remove surface-layer-absorbed air and both from the parts to be united and from the larger zone; maintaining all the zones in a vacuumized condition while applying heat of the order of 1750° F. for a time of the order of 10–15 minutes to both major faces of the compressible zone and fusing and flowing the brazing material into engagement with both the planar parts and the intermediate part; and transforming the compositions thereof, by maintaining a temperature of the order of 400° F. for a time of the order of 3–5 minutes, to an intermediate composition applying while equal and oppositely directed compressive forces to the compressible zone so as to force the brazing material into the form of deep fillets having thicknesswise extensive engagement with the intermediate part while maintaining the brazing and transforming temperature of the order of −320° F.

for a time of the order of 2–15 minutes and the vacuumized condition; step-cooling the compressible zone and its contents to a temperature to transform the parts into another metallurgical condition discontinuing this refrigeration and raising the temperature of the order of 850° F. for a time of the order of four hours of the compressible zone and contents to a temperature returning the flexible zone and contents to room temperature; removing the flexible zone and contents from the zone of operations.

3. In a method of laminating of the type described and including a zone in which a plurality of metallic components of a structural panel are to be bonded together by means of a sheet of brazing material that is highly susceptible to skulling and is interposed between each pair of said components, the improvement steps comprising: placing stainless steel metallic panel-components and the sheet of brazing material in a zone of operations; removing from said zone all gaseous and foreign matter to create an approximately complete vacuum in said zone; elevating the temperature of said zone to a fusion temperature of the order of 1750° F. and maintaining same for 10–15 minutes while maintaining the vacuum; and rapidly reducing the temperature of the zone and the work to a temperature of the order of 400° F. in about 1–5 minutes to a trigger annealing temperature to obviate breakdown of the bonding material as well as to prevent excessive and extensive flow of the liquefied bonding material with respect to said components.

4. In a method of laminating of the type described and including a zone in which a plurality of metallic components of a structural panel are to be bonded together by means of a sheet of brazing material highly susceptible to skulling and interposed between each pair of the components, the improvement steps comprising: placing metallic panel-components of austenitic material with said brazing material interposed between each pair of the components in a zone of operations; removing from said zone all gaseous and foreign matter to create an approximately complete vacuum; substantially immediately elevating the temperature of said zone to a fusion temperature of the order of 1750° F. and holding same for at least 10 minutes while maintaining the vacuum; and subsequently extremely rapidly reducing the temperature of the zone and the work to a trigger annealing temperature of the order of 400° F. and holding same for at least 3 minutes while maintaining the vacuum to obviate breakdown of the bonding material as well as to prevent excessive and extensive flow of the liquefied bonding material with respect to said components; said reduced temperature being of an order sufficiently high to prevent, at this juncture, alteration in the basal metallurgical structure of the metallic materials.

5. In a method of laminating of the type described and including a zone in which a plurality of metallic components of a structural panel are to be bonded together by means of brazing material readily susceptible to skulling and interposed between each pair of said components, the improvement steps comprising: placing stainless steel metallic panel-components with brazing material of a composition that is highly susceptible to skulling interposed between each pair of said components in a zone of operations; removing from said zone all gaseous and foreign matter to create a close approximation to a vacuum; elevating the temperature of said zone to a fusion temperature of the order of 1750° F. and holding same for at least 10 minutes while maintaining the vacuum; subsequently extremely rapidly lowering the temperature of the zone to −320° F. and holding same for at least 12 minutes while maintaining the vacuum at a temperature sufficient to sub-freeze the components of the panel, except the brazing material, and temper same; and raising the temperature of the components to 850° F., which is a degree sufficiently near the brazing temperature regime to precipitation-harden same.

6. In a method of laminating together a plurality of metallic members by means of brazing material which is highly susceptible to skulling, said material being interposed between each pair of said members in a zone of operations, the improvement steps of: placing stainless steel components in said zone with a bonding layer that is highly susceptible to skulling said layer being interposed between adjacent members of each pair of said components; evacuating the zone to clear same of all gases and to remove the surface layer of air from adsorption to the surface of said members; and continuing with said evacuation to maintain a vacuum in the zone and keep it free of all gaseous and foreign matter while fusion-heating said components so as to thereby remove from the zone of operations and from said members; contaminant-gases as they are driven out of said members by the heating thereof, thereby to obviate heat-and-air effectuated corrosion of the jointure.

7. In a method of the type described, the improvement steps that comprise: interposing in parallelism between a pair of stainless steel metallic members a sheet of brazing material consisting of an alloy that is quite susceptible to skulling; rapidly applying heat by direct thermal condition to said sheet through one of said metallic members and raising its temperature to a temperature of the order of 1750° F. and holding it at said order for a time of the order of 10–15 minutes; lowering the temperature of said sheet and said members to a temperature of the order of 400° F.; holding said members and sheet at the last-said temperature for a time period of the order of 3–5 minutes; immediately thereafter rapidly lowering the temperature of said members and said sheet to a brazing sheet-skulling preventing temperature of the order of −320° F. and holding them at this temperature for a time period sufficient to harden said members, said time period being of the order of 2–15 minutes; raising the temperature of said members to a temperature of the order of 850° F. and holding it at said temperature for a time period of the order of four hours to effect precipitation hardening of said members; and cooling said members to room temperature.

References Cited in the file of this patent

UNITED STATES PATENTS

| | | |
|---|---|---|
| 2,178,527 | Wellman | Oct. 31, 1939 |
| 2,396,940 | Carson | Mar. 19, 1946 |
| 2,473,712 | Kinney | June 21, 1949 |
| 2,686,957 | Koerper | Aug. 24, 1954 |
| 2,686,958 | Eber et al. | Aug. 24, 1954 |
| 2,767,301 | Reichelt | Oct. 16, 1956 |
| 2,845,698 | Giovannucci et al. | Aug. 5, 1958 |
| 2,851,582 | Meyers et al. | Sept. 9, 1958 |
| 2,903,386 | Waxweiler | Sept. 8, 1959 |
| 2,926,761 | Herbert | Mar. 1, 1960 |
| 2,940,557 | Herbert | June 14, 1960 |
| 2,944,504 | Herman et al. | July 12, 1960 |
| 2,978,806 | Herbert | Apr. 11, 1961 |
| 2,979,005 | Herbert | Apr. 11, 1961 |

FOREIGN PATENTS

| | | |
|---|---|---|
| 448,683 | Canada | May 25, 1948 |